United States Patent [19]

Matsuura et al.

[11] Patent Number: 5,561,359
[45] Date of Patent: Oct. 1, 1996

[54] DISCHARGE PATH FOR A BATTERY COMPARTMENT OF AN ELECTRIC VEHICLE

[75] Inventors: Masaaki Matsuura; Masahiko Kuroki, both of Saitama, Japan

[73] Assignee: Honda Giken Kogyo Kabushiki Kaisha, Tokyo, Japan

[21] Appl. No.: 224,773

[22] Filed: Apr. 8, 1994

[30] Foreign Application Priority Data

Apr. 9, 1993 [JP] Japan ..................... 5-083029

[51] Int. Cl.⁶ ............. H01M 10/46; B60R 11/00; B60R 16/04
[52] U.S. Cl. ............. 320/5; 180/68.2; 180/68.5
[58] Field of Search ............ 320/2, 5, 15; 290/1 B, 290/55; 180/68.1, 68.2, 68.5

[56] References Cited

U.S. PATENT DOCUMENTS

| | | |
|---|---|---|
| 4,135,593 | 1/1979 | Fowkes . |
| 4,267,895 | 5/1981 | Eggert, Jr. ............... 180/68.5 |
| 5,320,190 | 6/1994 | Naumann et al. . |

FOREIGN PATENT DOCUMENTS

| | | |
|---|---|---|
| 2323544 | 9/1976 | France . |
| 2688174 | 9/1993 | France . |
| 3316512 | 11/1984 | Germany . |
| 4018347 | 12/1991 | Germany . |
| 60-89063 | 5/1985 | Japan . |

OTHER PUBLICATIONS

Patent Abstracts of Japan, vol. 9, No. 234 (E–344) (1957), Sep. 20, 1985 & Japan 60–89063 (Nissan Jidosha K.K.), May 18, 1985.

Primary Examiner—Peter S. Wong
Assistant Examiner—Edward Tso
Attorney, Agent, or Firm—Birch, Stewart, Kolasch & Birch, LLP

[57] ABSTRACT

Concentration of hydrogen gas generated during a process of electrically recharging a battery of an electric vehicle is maintained by discharging the hydrogen gas during the process. An electric fan is installed inside a control unit box for accommodating a motor, an electric recharger and a control apparatus. The electric fan communicates ambient air to a motor through ducts. The air is further communicated to batteries through a duct and a nozzle member. Air directed by the electric fan during operation of the electric vehicle cools the motor driver and the motor. On the other hand, air communicated by the electric fan during a process of electrically recharging the batteries cools the electric recharger and then flows from the nozzle member to the batteries, blowing off hydrogen gas generated by the batteries during the electrical recharging process.

23 Claims, 9 Drawing Sheets

DISCHARGE PATH FOR A BATTERY COMPARTMENT OF AN ELECTRIC VEHICLE

BACKGROUND OF THE INVENTION

1. Field of the Invention

The present invention relates to an electric vehicle driven by a motor powered by a rechargeable battery accommodated in a battery compartment.

2. Description of the Background Art

In Japanese Patent Laid-open No. 60-89063, an electric vehicle is disclosed wherein a battery is cooled by flowing air into a battery compartment of the electric vehicle for preventing the battery from being heated during operation of the electric vehicle. Thus, the performance of the battery is prevented from deteriorating.

SUMMARY AND OBJECTS OF THE INVENTION

Figure 5:
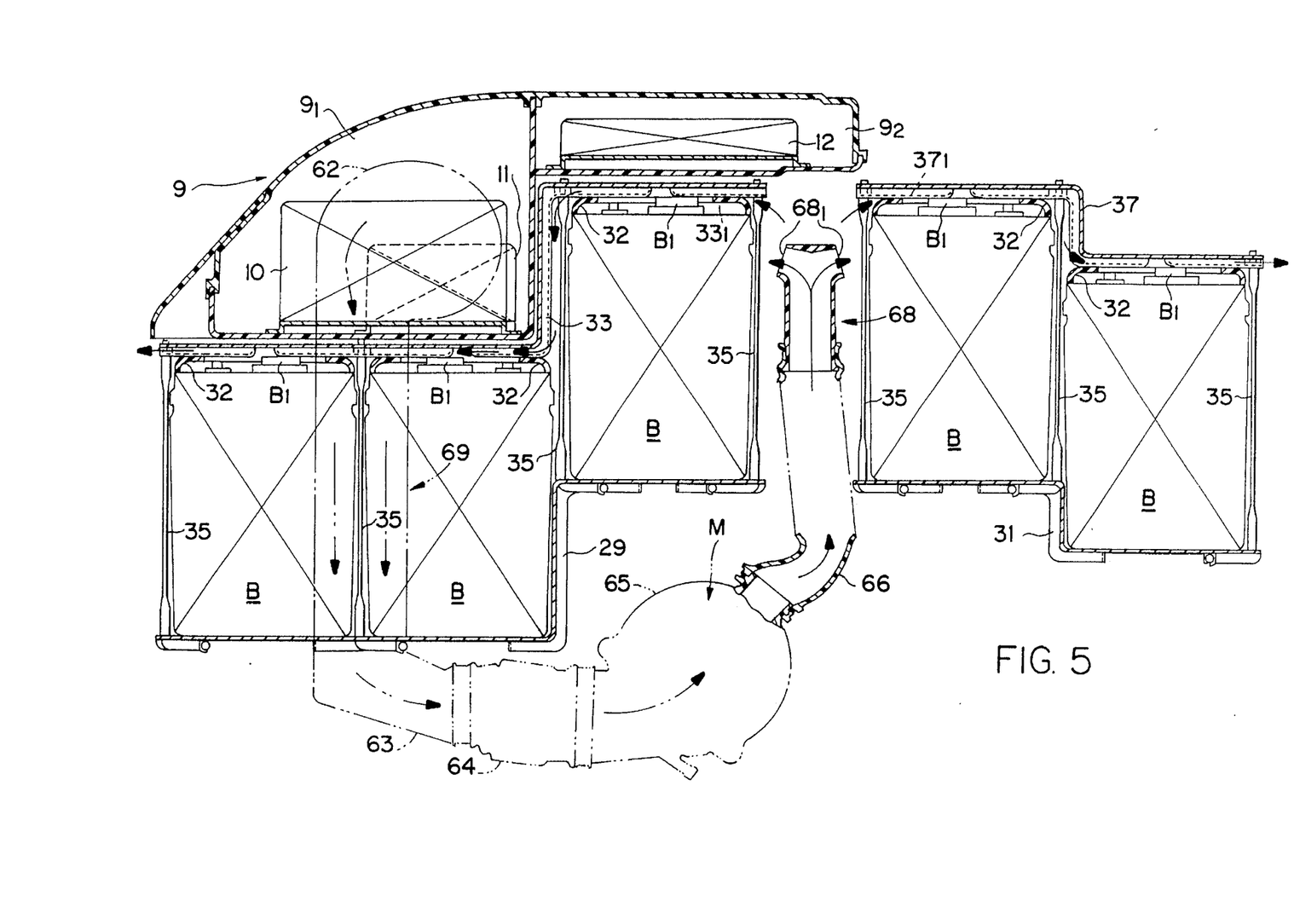
FIG. 5 is a cross-sectional diagram along line 5—5 shown in FIG. 4.
Figure 6:
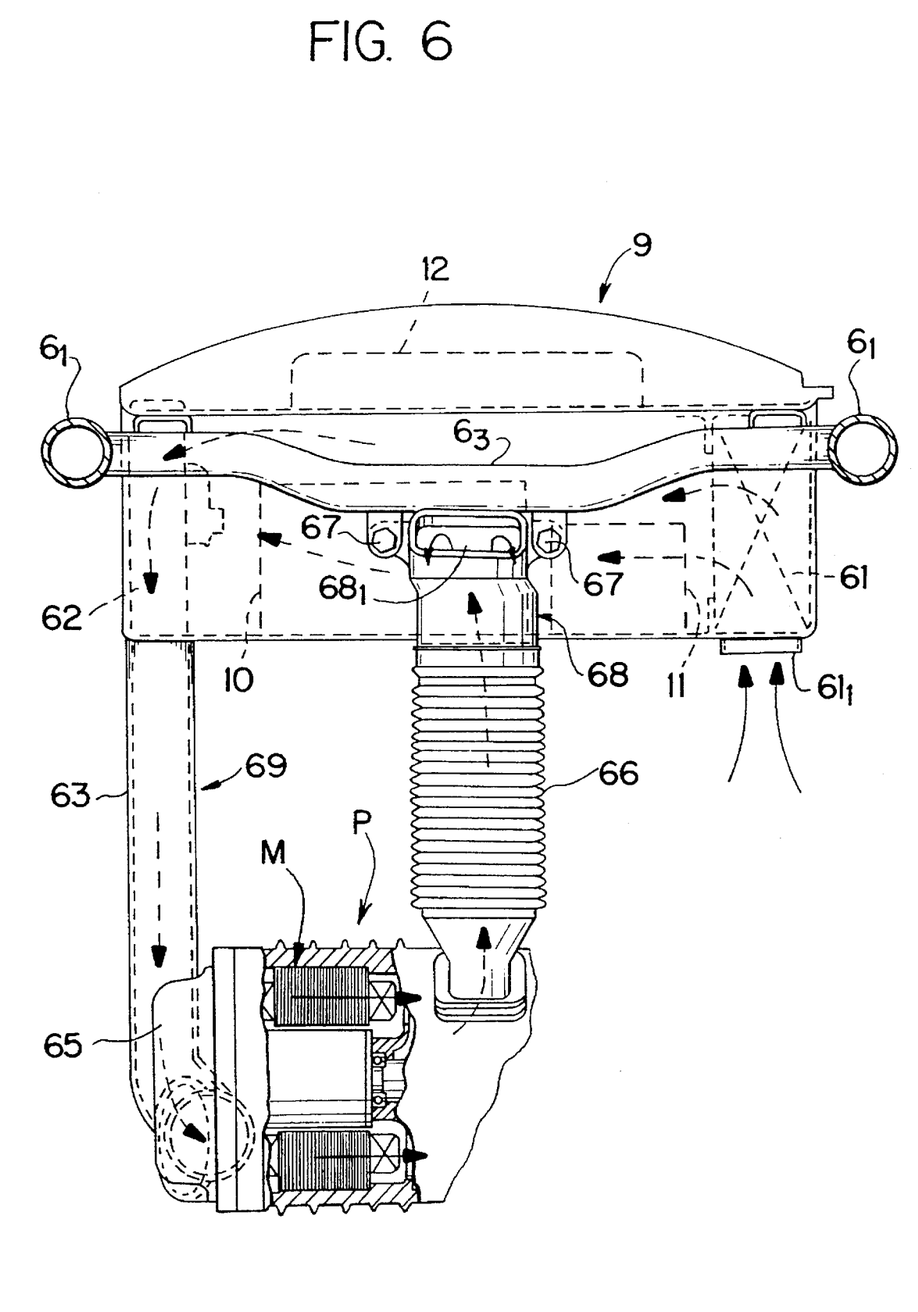
FIG. 6 is a cross-sectional diagram along line 6—6 shown in FIG. 4.

Hydrogen gas may be generated from the battery during a process of electrically recharging the battery. In such a case, a means for exhausting the hydrogen gas from inside the battery compartment is required. As illustrated in FIG. 5, in the case of a conventional electric vehicle disclosed in the specification of the above patent wherein a battery is cooled by air flowing into a battery compartment of the electric vehicle, it requires much labor in order to exhaust the hydrogen gas from inside the battery compartment during the process of electrically recharging the battery because no air is expected to flow at that time. The hydrogen gas can be exhausted, for example, by opening the cover of the battery compartment. None the less, it is in some cases difficult to adequately exhaust the hydrogen gas by merely opening the cover of the battery compartment.

The present inventions does address the problems described above. It is an object of the present invention to provide an electric vehicle which allows the amount of hydrogen gas inside a battery compartment to be reduced with ease.

In order to achieve the object of the present invention described above, the present invention provides an electric vehicle driven by a motor powered by a rechargeable battery accommodated in a battery compartment. The electric vehicle is equipped with an electric fan rotated during operation of the electric vehicle and, during a process of electrically recharging the battery. An air path is provided for communicating an air flow generated by the electric fan to said motor and the battery compartment.

In addition, the present invention also provides an electric vehicle wherein, said air path is connected to a control unit box for accommodating a motor driver and an electric recharger on top of the configuration as described above.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
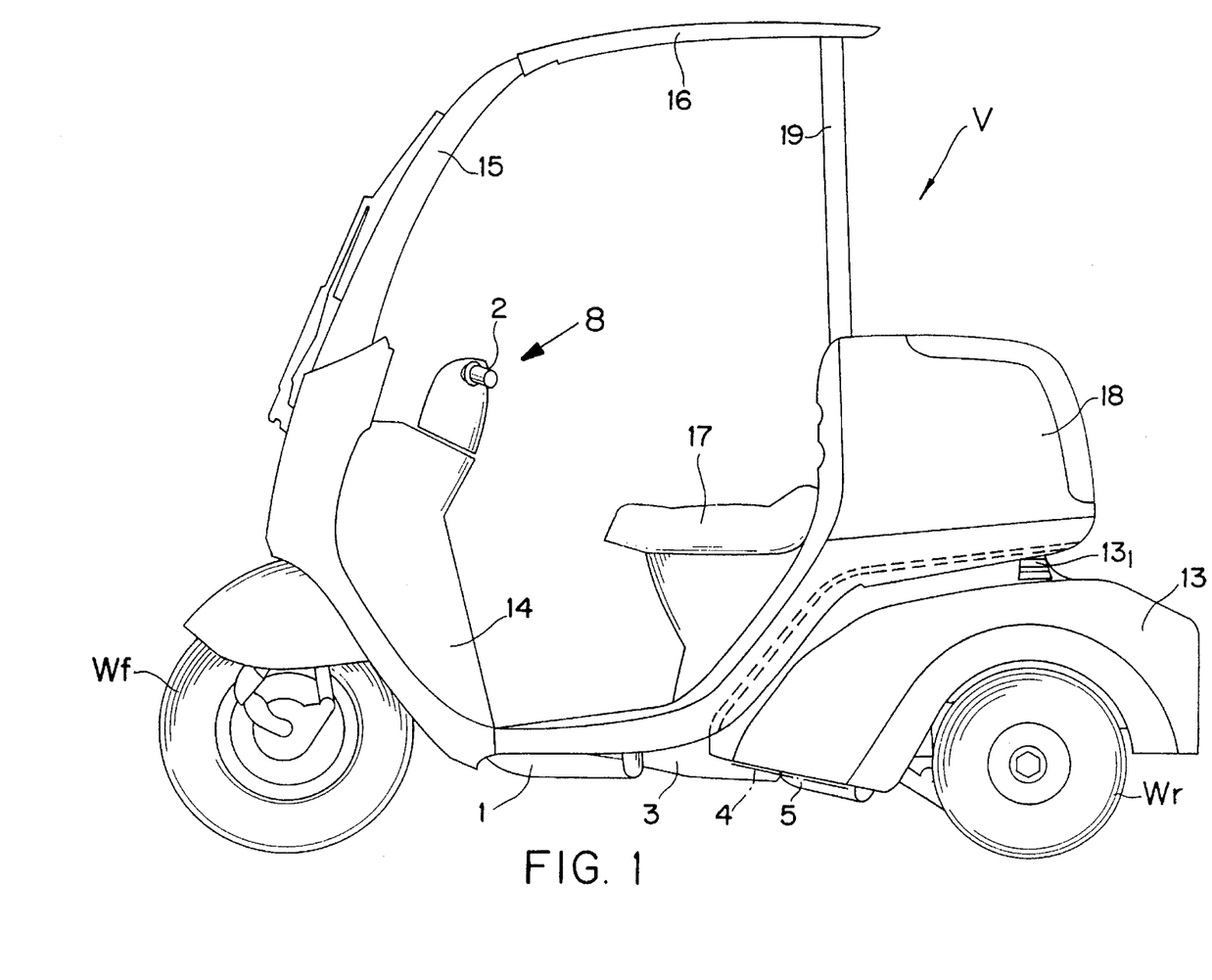
FIG. 1 shows an overall side diagram of a motorized three wheel vehicle.
Figure 2:
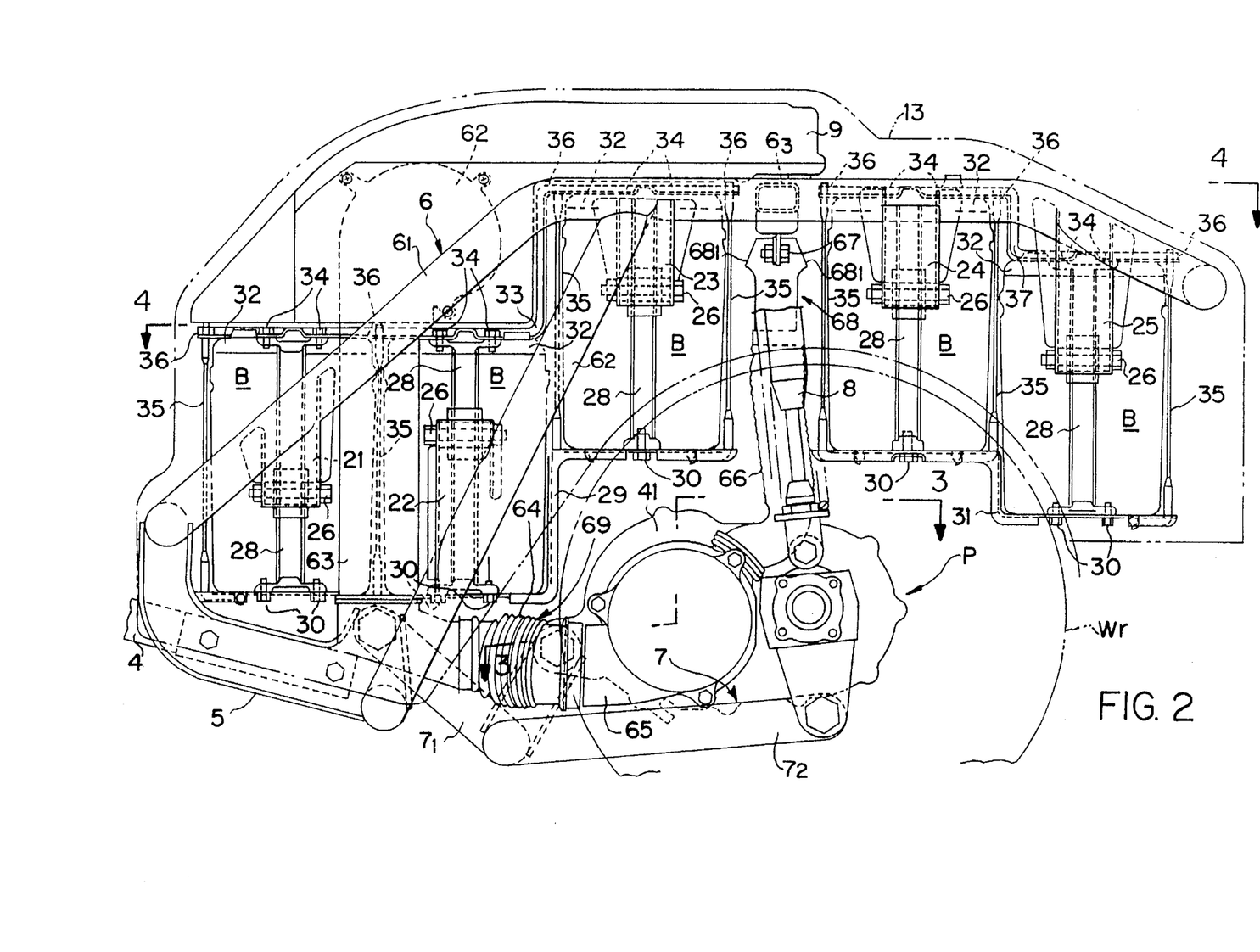
FIG. 2 shows a side diagram of the rear portion of the vehicle body.

As shown in FIGS. 1 and 2, a motorized three wheeler V which is driven by electric power includes a front body frame 1 having a welded steel configuration for supporting a front wheel Wf operated by a handle 2 on the front side. A front body bracket 3 is provided on the rear portion of the front body frame 1. The front body bracket 3 supports a rear body bracket 5 through a swing axis 4 installed in the longitudinal direction of the vehicle body. The front portion of the swing axis 4 is slightly elevated upward in comparison to its rear portion. The rear body bracket 5 can rotate and move freely in the left and right directions. The front end of a main rear body frame 6 is fixed on the rear body bracket 5. As illustrated in FIG. 2, the main rear body frame 6 includes a first frame member 61, a second frame member 62 and a third frame member 63. The main rear body frame 6 supports an auxiliary rear body frame 7 comprising a first frame member 71 and a second frame member 72. The auxiliary rear body frame 7 can freely move up and down. A power unit P is mounted on the auxiliary rear body 7. The power unit P is used for accommodating a motor for driving a pair of rear wheels Wr on the right and left sides of the vehicle body and an automatic transmission. The main rear body frame 6 and the auxiliary rear body frame 7 are linked to each other by a couple of rear cushions 8 on the left and right sides. When the motorized three wheeler V is moving, the front body frame 1 can be moved to the right or the left relatively to the main rear body frame 6 and the auxiliary rear body frame 7 while the auxiliary rear body frame 7 can be moved up and down relatively to the main rear body frame 6.

As illustrated in FIG. 2, the main rear body frame 6 supports five rechargeable zinc batteries B. The batteries B are suspended from the main rear body frame 6. Three of the five batteries. B are located front of the rear shocks 8. A control unit box 9 is placed on the three batteries B. The control unit box 9 is divided into a front compartment 91 and a rear compartment 92. The front compartment 91 is used for accommodating a motor driver 10 and an electric recharger 11 for electrically recharging the batteries B whereas the rear compartment 92 is used for accommodating a control apparatus 12. The five batteries B and the control unit box 9 are covered by a battery compartment 13 made of compound resin. The bottom surface of the battery compartment 13 is opened. As illustrated in FIG. 1, a ventilation opening $13_1$ is created on the top of the battery compartment 13 in the transversal direction. The front body frame 1 is covered by a body 14 also made of compound resin. A windshield 15 and a roof 16 are connected to the front portion of the body 14 for protecting the driver against wind, rain and direct sunlight. The rear end of the roof 16 is supported by the upper edge of a pillar 19 which is established between a driver's seat 17 and a trunk 18.

Figure 4:
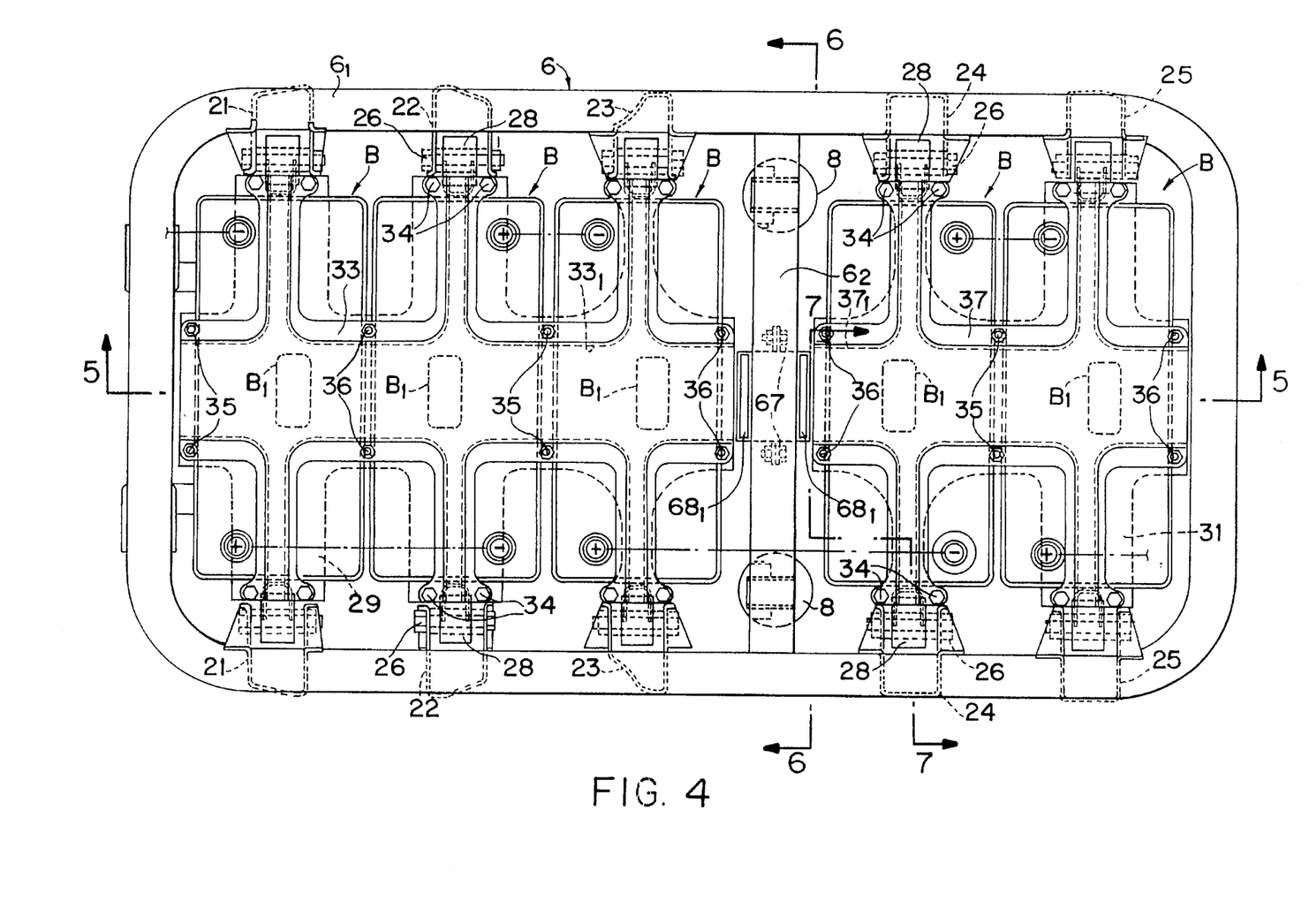
FIG. 4 is an elevational cross-sectional view along line 4—4 shown in FIG. 2.
Figure 7:
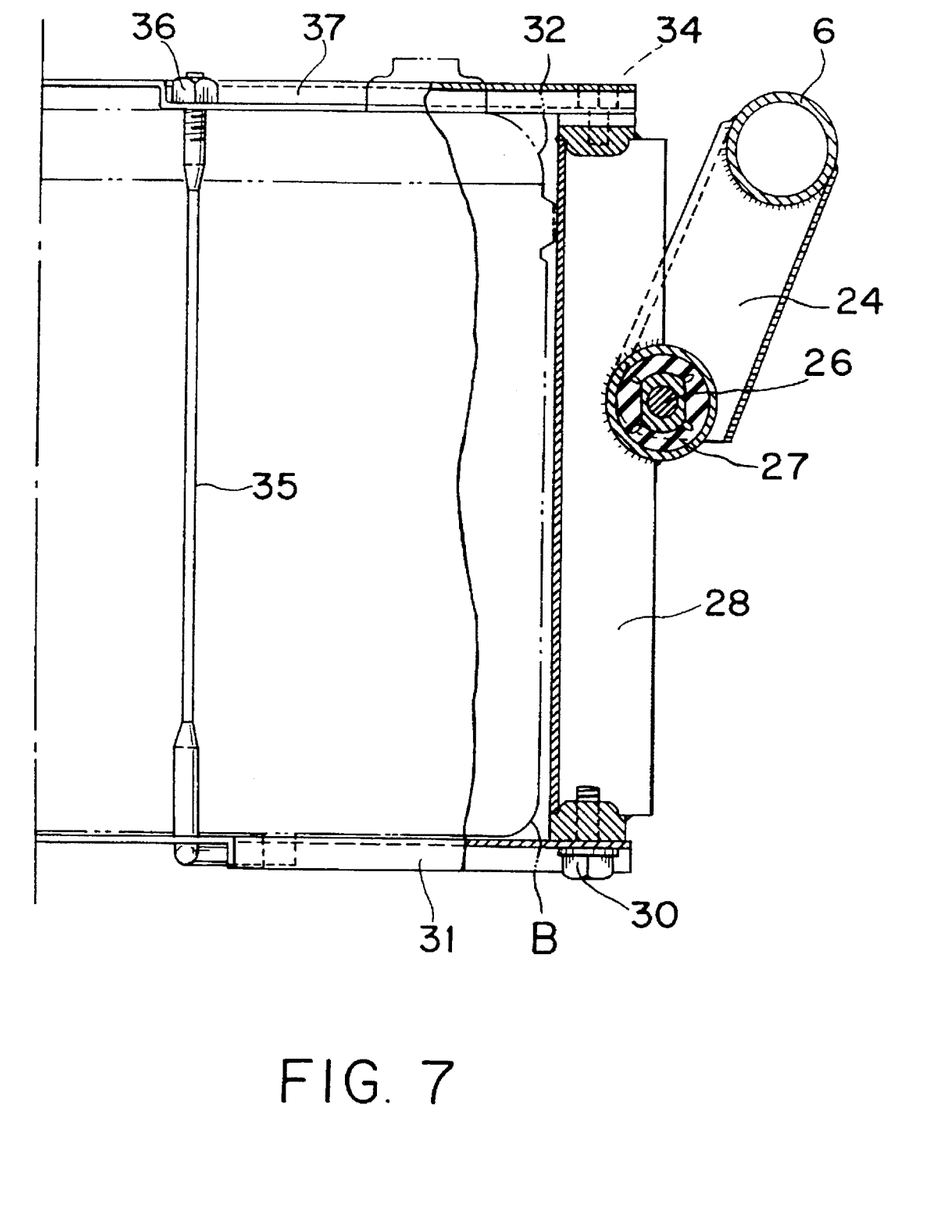
FIG. 7 is a cross-sectional diagram along line 7—7 shown in FIG. 4.

Next, a structure which supports the five batteries B is described by referring to FIGS. 2, 4 and 7. Five battery support brackets 21, 22, 23, 24 and 25 each for supporting one of the five batteries B are welded to the right and left sides of the first and second frame members 61 and 62 of the main rear body frame 6. Four bolts 26 pass through the lower ends of the battery support brackets 21, 23, 24 and 25 in the longitudinal direction of the vehicle body. Likewise, another bolt 26 passes through the upper end of the battery support bracket 22 also in the longitudinal direction of the vehicle body. Each of the bolts 26 supports a pair of battery hangers 28 through a rubber bushing 27 as shown in FIG. 7. A front bottom plate 29 is fixed to the lower edges of the three pairs of battery hangers 28 on the front side by bolts 30. The front bottom plate 29 is used for supporting the bottom surfaces of the three batteries B on the front side.

As illustrated in FIG. 4, the front bottom plate 29 has a step in the lengthwise middle thereof, supporting the two front-most batteries B at a position lower than the middle battery B. On the other hand, a rear bottom plate 31 is fixed to the lower edges of the two pairs of battery hangers 28 on the rear side by other bolts 30. The front bottom plate 31 is used for supporting the bottom surfaces of the remaining two batteries B on the rear side. Similarly, the rear bottom plate 31 has a step in the lengthwise middle thereof, supporting the rear-most battery B at a position lower than the other front battery B.

A front cover plate 33 is placed on the upper surfaces of the three batteries B on the front side, being separated from each other by spacers 32. The front cover plate 33 is fixed on the upper edges of the battery hangers 28 by bolts 34 and also fixed to the upper ends of eight rods 35 by nuts 36. The eight rods 35 are established on the front bottom plate 29. Accordingly, the right and left-side surfaces of the three batteries B on the front side are positioned by the battery hangers 28 whereas their front and rear-side surfaces are positioned by the rods 35. Furthermore, the bottom and top surfaces are tightly held at fixed positions by the front bottom plate 29 and the front cover plate 33, respectively. Likewise, the right and left-side surfaces of the remaining two batteries B on the rear side are positioned by the battery hangers 28 whereas the front and rear-side surfaces are positioned by the rods 35. Furthermore, the bottom and top surfaces are tightly held at fixed positions by the rear bottom plate 31 and the rear cover plate 37, respectively.

Figure 3:
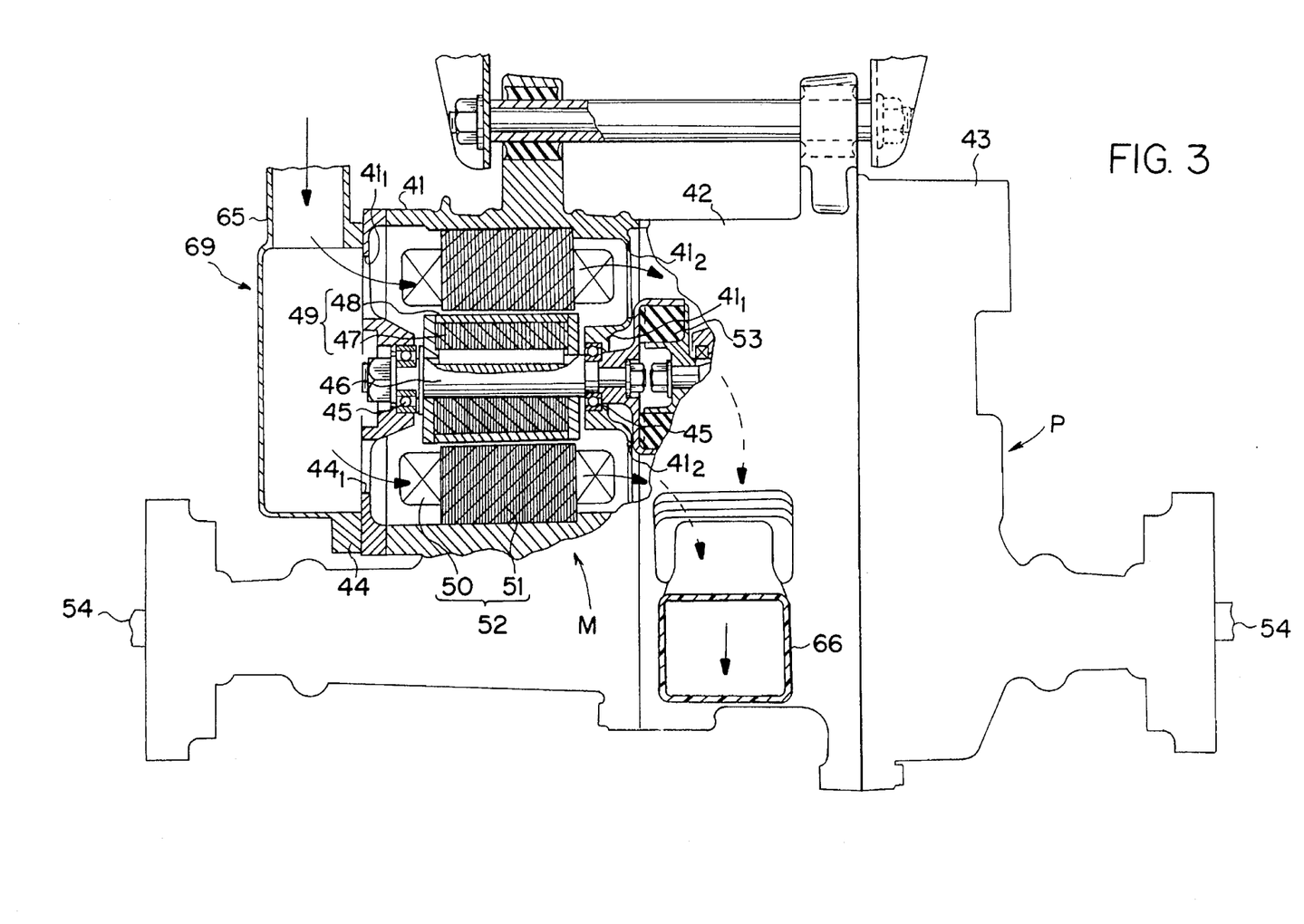
FIG. 3 is a cross-sectional diagram along line 3—3 shown in FIG. 2.

Next, the structure of the motor M is explained by referring to FIG. 3. The power unit P comprises a left-side casing 41, a middle casing 42 and a right-side casing 43 with three compartments therein laid out in the longitudinal direction of the vehicle body. The left-side, middle and right-side casings 41, 42 and 43 are separated from each other by two vertical walls. The left-side, middle and right-side casings 41, 42 and 43 are joined to each other as a single body so as to form a single block. A rotation axis 46 is supported by a pair of bolt bearings 45 between a right-end side wall $41_1$ of the left-side casing 41 and a cover 44 veiling a left-end opening of the left-side casing 41. A rotor 49 is mounted on the rotation axis 46. The rotor 49 is provided with a permanent magnet 48 on the circumference of an iron core 47 thereof. A stator 52 comprising iron cores 50 and coils 51 wound around the iron cores 50 is supported around the rotor 49.

A force driving the rotation axis 46 of the motor M is transmitted to an automatic transmission accommodated inside the middle casing 42 and the right-side casing 43 through a rubber coupling 53. It should be noted that the automatic transmission itself is not shown in FIG. 3. The force is further transmitted to a vehicle axis 54 of the right and left rear wheels Wr through a differential gear which is also not shown in FIG. 3. The automatic transmission has typically one to four speeds for movement in the forward direction. Movement in the backward direction is carried out by reversing the rotation of the motor M at a state of the first speed for the movement in the forward direction.

Next, the structure of a cooling system is described by referring to FIGS. 2 to 6. An air cleaner 61 is provided on the right side of the front compartment 91 of the control unit box 9. The air cleaner 61 includes an opening at the bottom serving as a cooling air inlet $61_1$. An electric fan 62 is provided on the left sides of the front compartment 91 of the control unit box 9. The lower end of an L-shaped first duct 63 extends from the electric fan 62 in the downward direction and is connected to a third duct 65 provided on the left-side surface of the power unit P through a second duct 64. The third duct 65 is adjustable to accommodate the connection between the power unit P and the second duct 64. The third duct 65 is connected to the inside of the motor M through a plurality of openings $44_1$ formed on the cover 44. The inside of the motor M is connected to the inside of the middle casing 42 through a plurality of openings $41_2$ formed on a right-end side wall $41_1$ of the left-side casing 41.

A fourth duct 66 is provided which is adjustable to accommodate a connection with the middle casing 42 and extends in an upward direction. The upper end of the fourth duct 66 is connected to a nozzle member 68 which is fixed to a frame member 63 of the main rear body frame 6 by two bolts 67. On the upper end of the nozzle member 68, a pair of nozzles $68_1$ with openings extending in forward and rearward directions of the vehicle body are created. The first to fourth ducts 63 to 66 together constitute an air-flow path 69.

It is obvious from FIGS. 4 and 5 that a breezer $B_1$ is provided on the top of each of the batteries B for exhausting hydrogen gas generated during a process of recharging the batteries B. An inlet of a path $33_1$ created on the front cover plate 33 faces the nozzle $68_1$ on the front side so that the path $33_1$ is connected to the breezers $B_1$ over the three batteries B on the front side. Likewise, an inlet of a path $37_1$ created on the rear cover plate 37 faces the nozzle $68_1$ on the rear side so that the path $37_1$ is connected to the breezers $B_1$ over the two batteries B on the rear side.

Figure 8:
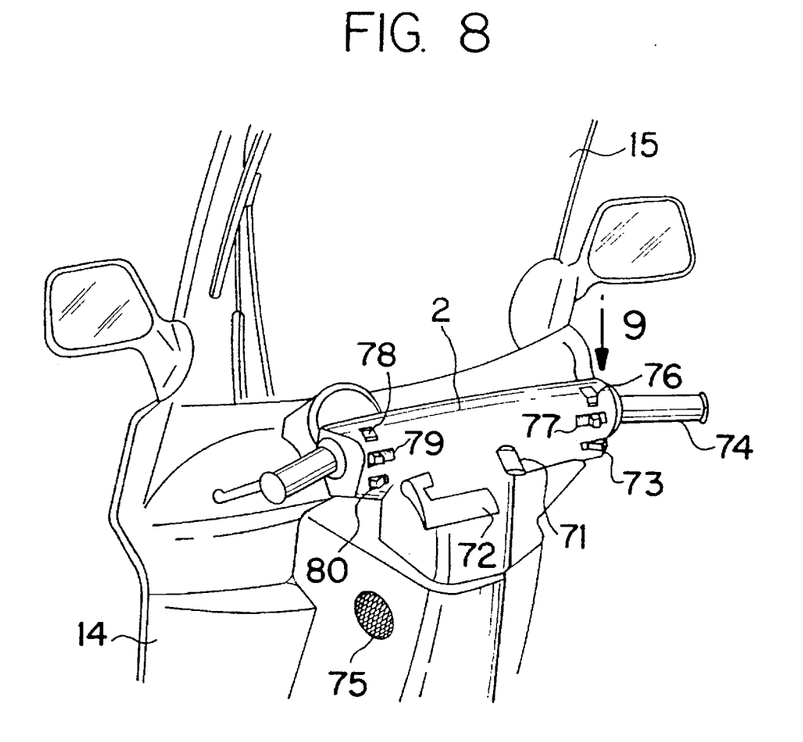
FIG. 8 is a partial perspective view taken in a direction denoted by reference numeral 8 shown in FIG. 1.
Figure 9:
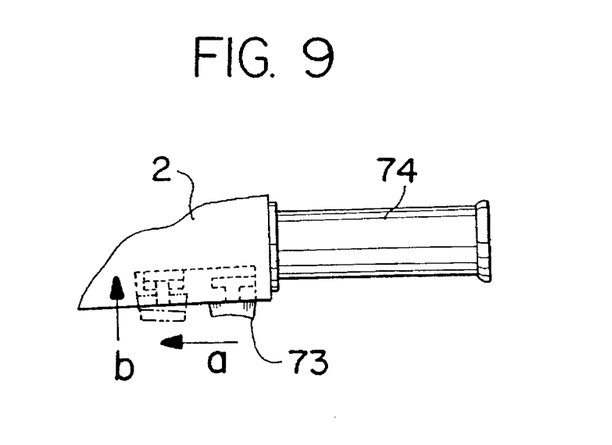
FIG. 9 is a partial perspective view taken in a direction denoted by reference numeral 9 shown in FIG. 8.

As shown in FIGS. 8 and 9, a main switch 71, a parking lever 72 and a reverse switch 73 are provided on the handle 2 of the motorized three wheel vehicle. The reverse switch 73 is provided in close proximity to an acceleration grip 74. In this way, the driver can operate the reverse switch 73 while putting his hand on the acceleration grip 74. The reverse switch 73 is operated in a two-stage motion. First of all, the reverse switch 73 is actuated from a position indicated by a solid line in a direction denoted by an arrow (a). Then, the reverse switch 73 is pushed in a direction indicated by an arrow (b). By actuating the reverse switch 73 in these two operations, the motorized three wheel vehicle moves in the rearward direction. It should be noted, however, that the two-stage motion may also be accomplished in two slide steps as well. The motorized three wheel vehicle moves in the rearward direction as long as the reverse switch 73 is being pushed in the direction denoted by the arrow (b). As the driver's hand is released from the reverse switch 73, the reverse switch 73 automatically returns to its original position, stopping the movement of the motorized three wheel vehicle in the rearward direction. On the lower left portion of the handle 2, a buzzer 75 is provided for generating a sound during a movement of the motorized three wheel vehicle in the rearward direction.

As illustrated in FIG. 8, a head-light ON/OFF switch 76 and a wiper ON/OFF switch 77 are provided. In addition, a head-light dimmer switch 78 and blinker switch 79 are also provided together with a horn switch 80.

Next, the principle of operation of the embodiment provided by the present invention having the structure; configuration explained above is described. While the motorized three wheel vehicle is running, the electric fan 62 is driven all the time by the batteries B. The fan 62 communicates cooling air from a cooling air inlet 61₁ of the air cleaner 61 provided on one side of the battery compartment 9 to the front compartment 91 of the battery compartment 9 through the air cleaner 61. The cooling air cools the motor driver 10 which is heated while it is driving the motor M: After cooling the motor driver 10, the cooling air enters the first duct 63 through the electric fan 62 provided on the other side of the battery compartment 9, flowing to the inside of the motor M through the second and third ducts 62 and 63. Inside the motor M, the cooling air flows around the rotor 52 for cooling the rotor 52. By cooling the motor driver 10 and the motor M, the cooling air is heated. The heated cooling air flows from the two nozzles 68₁ on the front and rear sides of the nozzle member 68 to the inside of the battery compartment 13 through the fourth duct 66. The five batteries B accommodated in the battery compartment 13 are heated by the hot air entering therein.

As described above, the motor driver 10 is cooled by the electric fan 62 which is also used for cooling the motor M as well. Thus, a special cooling means for cooling the motor driver 10 is not required. On top of that, the air which has been heated in the process of cooling the motor driver 10 and the motor M is then used for heating the batteries B. As a result, the capacity of the batteries B is increased, lengthening a distance that can be traveled for each electrical recharging operation.

As the batteries B are discharged, the batteries B are recharged by supplying electric power from an external source to the electric recharger 11 installed in the battery compartment 9. At that time, the electric fan 62 is driven also by the electric power supplied from the external source. The electric fan 62 provides air into the battery compartment 9, cooling down the heated electric recharger 11.

After cooling the electric recharger 11, the cooling air flows into the battery compartment 9 through the air-flow path 69 and the nozzle member 68. At that time, hydrogen gas generated by the batteries B undergoing a recharging process is exhausted from the breezers B₁ to the paths 33₁ and 37₁ of the front and rear cover plates 33 and 37 which veil the upper surfaces of the batteries B. Hydrogen gas is discharged by the cooling air flowing from the nozzle 68₁ of the nozzle member 68 toward the paths 33₁ and 37₁. The hydrogen gas is exhausted from the ventilation opening 13₁ of the battery compartment 13. Accordingly, the hydrogen gas generated by the batteries B undergoing the recharging process is prevented from filling up the battery compartment 13. As a result, the concentration of the hydrogen gas can be kept below an upper concentration limit.

Figure 10:
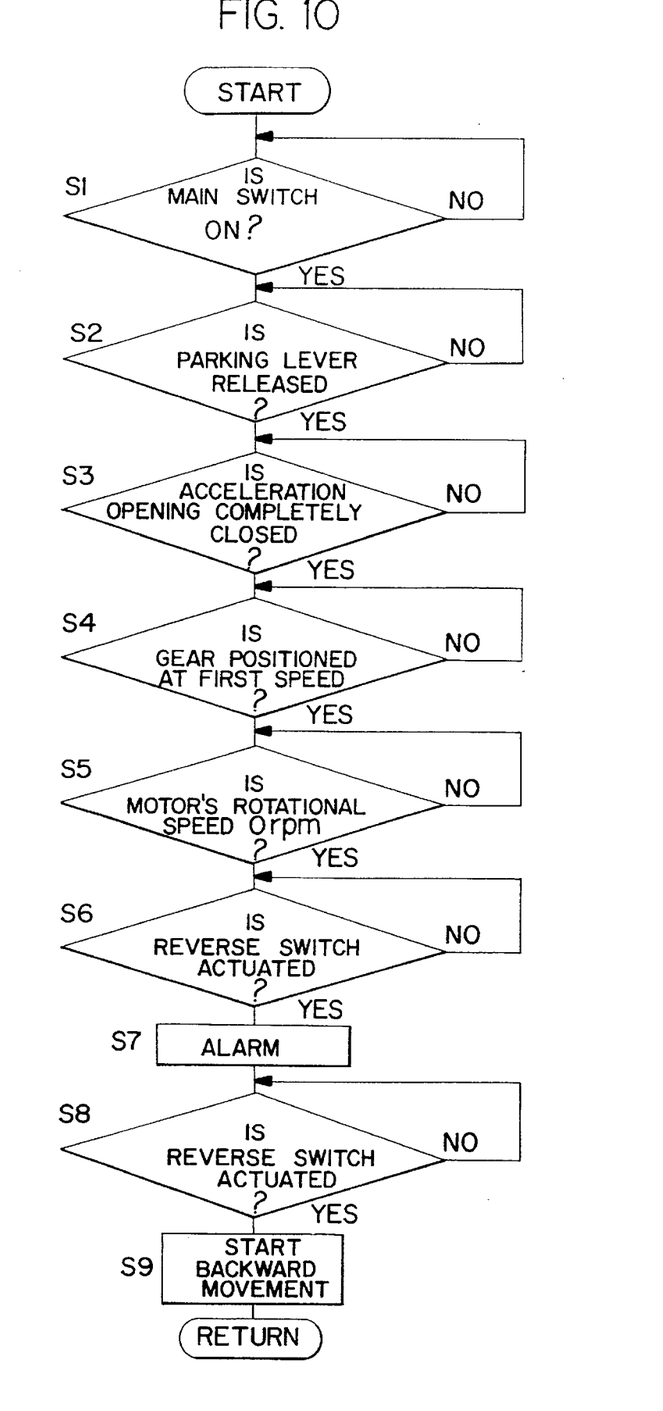
FIG. 10 is a flowchart showing an operation of backward movement.

The following is a description of the operations for moving the motorized three wheeler V in the backward direction with reference to a flowchart shown in FIG. 10. The backward movement of the motorized three wheeler V can be carried out if the following conditions are all satisfied. Whether the conditions are satisfied or not is verified in accordance with a procedure shown as a flowchart in FIG. 10 as follows. At a step S1 of the flowchart, the state of the main switch S1 is checked. That is to say, whether the main switch S1 is turned on or off is examined. As shown in the FIG. 10, step S2 determines whether or not a parking break 72 is released. Step S3 verifies if an acceleration-opening sensor detects an acceleration opening in a completely closed state. It should be noted that the acceleration-opening sensor itself is not shown in the figures. Subsequently, step S4 checks if the automatic transmission is positioned at the first speed. Finally, step S5 verifies that the rotational speed of the motor M detected by a motor rotational speed sensor, also not shown in the figures, is 0 rpm.

When the conditions described above are all satisfied, at a step S6, the driver actuates the reverse switch 73 in the direction denoted by the arrow (a) shown in FIG. 9. At step S7, the buzzer 75 serves as an indicator which generates a sound informing the driver of the fact that the motorized three wheel vehicle V can now be moved in the backward direction. Subsequently, at step S8, the driver actuates the reverse switch 73 in the direction denoted by the arrow (b) in FIG. 9. Then, at step S10, the motor M is rotated in the reverse direction by a command issued by the control apparatus 12 through the motor driver 10, starting the movement of the motorized three wheel vehicle V in the backward direction with the buzzer 75 generating a sound.

At that time, the driver does not have to operate the acceleration grip 74. The motor M rotates at a rotational speed set in advance, driving the motorized three wheel vehicle V in the backward direction at a speed of about 1.5 km/hr. As the driver releases the reverse stick 73 from his/her hand, the reverse stick 73 is restored to its original position automatically, halting the movement in the backward direction.

In this way, the driver can operate the reverse stick 73 while holding the accelerator grip 74. Accordingly, not only is the operability enhanced to result in easy driving, but the operation of the reverse stick 73 is also split into two steps: the slide and push operations. The slide operation causes the buzzer 75 to generate sound whereas the push operation starts the movement in the backward direction. As a result, a malfunction can certainly be avoided. Moreover, during the movement in the backward direction, the motorized three wheel vehicle V moves at a constant speed without the necessity to operate the acceleration grip 74. Thus, the driver does not have to worry about the adjustment of the speed, allowing himself to focus his attention on the operation of the handle 2.

The embodiment provided by the present invention has been described so far. It should be noted, however, that applications of the present invention are not limited to the embodiment described above. It is thus possible to implement a variety of small changes in design.

For example, even though the embodiment described above implements a motorized three wheel vehicle, the present invention can also be applied to a motorcycle or a four-wheel vehicle as well. In addition, the electric fan 62 does not have to be installed at a position as indicated in the embodiment. That is to say, the electric fan 62 can be placed at any location along the air, flow path 69. In addition, another type of indicator such as a chime or a lamp can also be used as well in place of the buzzer 75.

The present invention provides an electric vehicle wherein an electric fan rotates during the operation of the electric vehicle and a process of electrically recharging batteries generates an air flow, leading the air flow to the motor and a battery compartment. The air flow cools the motor during the operation of the electric vehicle and blows off hydrogen gas generated by the batteries during a process of electrically recharging the batteries, allowing the concentration of the hydrogen gas to be kept low. Thus, with the common single electric fan, not only can the motor be cooled, but the concentration of the hydrogen gas can also be reduced as well. As a result, the cost and the weight of the electric vehicle are not increase.

The air path of the electric vehicle is connected to a control unit box for accommodating a motor driver and an electric recharger. Accordingly, with the common single electric fan, the motor can be cooled during the operation of the electric vehicle whereas the electric re-charger can be cooled during the process of electrically recharging the batteries.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electric vehicle driven by a motor powered by a rechargeable battery accommodated in a battery compartment comprising:

an electric fan rotated during operation of said electric vehicle and during a process of electrically recharging said battery; and an air path for directing an air flow generated by said electric fan to said motor and thereafter to an upper portion of said battery compartment for first cooling said motor and subsequently discharging gases produced by said battery;

said air path is in communication with a control unit container for accommodating a motor driver and an electric recharger.

2. An electric vehicle driven by a rechargeable battery comprising:

a motor for propelling said vehicle, said motor being operatively connected to wheels rotatably mounted relative to said vehicle;

a battery compartment for containing said rechargeable battery;

a first air path in communication with ambient air;

an electric fan positioned in communication with said first air passage for supplying ambient air to said motor for cooling said motor; and a second air path for directing air from said motor to an upper portion of said battery compartment for discharging gases produced by said battery;

wherein said electric fan is actuated during operation of said electric vehicle and during a process of electrically recharging said battery;

said first air path is in communication with a control unit container for accommodating a motor driver and an electric recharger.

3. The electric vehicle according to claim 2, wherein said battery compartment includes a plurality of batteries operatively connected together for supplying power to said motor.

4. The electric vehicle according to claim 2, wherein said electric fan is positioned in an upper portion of said battery compartment for supplying ambient air downwardly for cooling said motor.

5. The electric vehicle according to claim 4, wherein said second air path extends upwardly from said motor for supplying ambient air to said battery compartment for discharging gases produced by said battery.

6. The electric vehicle according to claim 4, and further including an adjustable third duct for providing a connection between said first air path and said motor.

7. The electric vehicle according to claim 4, and further including an adjustable fourth duct for providing a connection between said second air path and said battery compartment.

8. The electric vehicle according to claim 2, and further including at least one nozzle affixed to a distal end of said second air path for facilitating the discharge of gases produced by said battery.

9. The electric vehicle according to claim 2, and further including a plurality of openings disposed in a surface of said battery compartment for assisting in the discharge of gases produced by said battery.

10. The electric vehicle according to claim 3, and further including a plurality of support brackets for securing said plurality of batteries within said battery compartment.

11. The electric vehicle according to claim 2, and further including a motor casing for positioning said motor, said motor casing includes a plurality of apertures for enabling air to flow from said first air path through said motor casing and into said second motor casing.

12. The electric vehicle according to claim 2, and further including an air cleaner operatively connected to said electric fan and said first air path for communicating ambient air to said motor and said battery compartment.

13. An electric vehicle driven by a rechargeable battery comprising:

a motor for propelling said vehicle, said motor being operatively connected to wheels rotatably mounted relative to said vehicle;

a battery compartment for containing said rechargeable battery;

a first air path in communication with ambient air;

an electric fan positioned in communication with said first air passage and being positioned in a portion of said battery compartment for supplying ambient air downwardly for cooling said motor; and a second air path for redirecting air from said motor to an upper portion of said battery compartment for discharging gases produced by said battery;

wherein said electric fan is actuated during operation of said electric vehicle and during a process of electrically recharging said battery.

14. The electric vehicle according to claim 13, wherein said battery compartment includes a plurality of batteries operatively connected together for supplying power to said motor.

15. The electric vehicle according to claim 13, wherein said second air path extends upwardly from said motor for supplying ambient air to said upper portion of said battery compartment for discharging gases produced by said battery.

16. The electric vehicle according to claim 13, and further including an adjustable third duct for providing a connection between said first air path and said motor.

17. The electric vehicle according to claim 13, and further including an adjustable fourth duct for providing a connection between said second air path and said battery compartment.

18. The electric vehicle according to claim 13, and further including at least one nozzle affixed to a distal end of said second air path for facilitating the discharge of gases produced by said battery.

19. The electric vehicle according to claim 13, and further including a plurality of openings disposed in a surface of said battery compartment for assisting in the discharge of gases produced by said battery.

20. The electric vehicle according to claim 14, and further including a plurality of support brackets for securing said plurality of batteries within said battery compartment.

21. The electric vehicle according to claim 13, and further including a motor casing for positioning said motor, said motor casing includes a plurality of apertures for enabling air to flow from said first air path through said motor casing and into said second motor casing.

22. The electric vehicle according to claim 13, and further including an air cleaner operatively connected to said electric fan and said first air path for communicating ambient air to said motor and said battery compartment.

23. The electric vehicle according to claim 13, said first air duct being in communication with a control unit container for accommodating a motor driver and an electric recharger.

* * * * *